United States Patent [19]

Miyamoto et al.

[11] 4,130,843
[45] Dec. 19, 1978

[54] RECORD INHIBIT DEFEAT IN A RECORDING AND REPRODUCING APPARATUS

[75] Inventors: Toshio Miyamoto, Tokyo; Mutsuo Hoshido, Kashiwa, both of Japan

[73] Assignee: Sony Corporation, Tokyo, Japan

[21] Appl. No.: 784,379

[22] Filed: Apr. 4, 1977

Related U.S. Application Data

[63] Continuation of Ser. No. 755,941, Dec. 30, 1976, abandoned.

[30] Foreign Application Priority Data

Jan. 8, 1976 [JP] Japan .................................. 51-1117

[51] Int. Cl.² ...................... G11B 15/12; G11B 15/04
[52] U.S. Cl. ......................................... 360/62; 360/60
[58] Field of Search ................... 360/60, 62, 61, 74, 360/13

[56] References Cited

U.S. PATENT DOCUMENTS

| | | | |
|---|---|---|---|
| 3,134,599 | 5/1964 | Roberts | 360/62 |
| 3,728,494 | 4/1973 | Kobler | 360/60 |
| 3,739,106 | 6/1973 | Huijsers | 360/60 |
| 3,921,214 | 11/1975 | Nyffenegger | 360/60 |
| 3,940,800 | 2/1976 | Tabuchi | 360/60 |

*Primary Examiner*—Jay P. Lucas
*Attorney, Agent, or Firm*—Lewis H. Eslinger; Alvin Sinderbrand

[57] ABSTRACT

In a recording and/or reproducing apparatus, for example, for use with tape cassettes, and which is of the type that requires both a record push-button and a forward push-button to be in their active positions for establishing the recording mode of operation, whereas the reproducing or playback mode of operation is established when only the forward push-button is in its active position; there are provided a first interlocking mechanism operative to prevent actuation of the record push-button to its active position after the forward push-button has been actuated to its active position so as to normally inhibit change-over of the apparatus directly from its reproducing mode of operation to its recording mode of operation, and a second interlocking mechanism operative in response to establishing of the recording mode of operation to disable the first interlocking mechanism and thereafter permit actuation of the record push-button to its active position with the forward push-button already in its active position until such time as the second interlocking mechanism is itself disabled in response to restoration of the apparatus to its stop mode, as by actuation of a stop push-button. Further, a latching mechanism for the mode selecting push-buttons is effective to retain the forward push-button in its active position upon changeover of the apparatus from its recording mode of operation to its rewind or fast-forward mode of operation so that, upon termination of a rewind or fast-forward operation of the apparatus, the recording mode of operation can be re-established simply by actuation of the record push-button.

16 Claims, 6 Drawing Figures

RECORD INHIBIT DEFEAT IN A RECORDING AND REPRODUCING APPARATUS

This application is a continuation of the applicant's copending application, Ser. No. 755,941, filed Dec. 30, 1976, which is now abandoned.

BACKGROUND OF THE INVENTION

1. Field of the Invention

This invention relates generally to recording and/or reproducing apparatus, for example, for use with tape cassettes, and more particularly is directed to an improved arrangement for controlling the selection and change-over of the modes of operation of the apparatus.

2. Description of the Prior Art

Recording and/or reproducing apparatus for use with tape cassettes are usually capable of recording, reproducing or playback, rewind and fast-forward operations, and such modes of operation are selectively established by actuation of respective controls which are usually in the form of push-buttons. In existing recording and/or reproducing apparatus of the described type, the reproducing or playback mode of operation is established merely by actuation of a forward push-button to its active position, whereas establishing of the recording mode of operation requires that both the forward push-button and a record push-button be simultaneously disposed in their respective active positions. Further, in existing apparatus of the described type, change-over of the apparatus from the reproducing mode of operation to the recording mode of operation requires an intervening restoration of the apparatus to its stop mode, as by actuation of a stop push-button. In other words, with the forward push-button retained in its active position, as by a latching mechanism, for establishing the reproducing mode of operation, the recording mode of operation cannot be directly established merely by actuation of the record push-button. Therefore, in changing-over from the reproducing to the recording mode of operation, it is necessary to actuate the stop push-button for causing the latching mechanism to release the forward push-button which thereby returns to its rest position for terminating the reproducing operation, and then to simultaneously actuate the forward push-button and record push-button for initiating or establishing the recording mode of operation.

The foregoing operating characteristics of the described recording and/or reproducing apparatus for use with tape cassettes make it difficult to employ such apparatus for dictation or other similar purposes in which repeated editing or changing of the recorded information and/or reviewing of the recorded information may be required. For example, when using the recording and/or reproducing apparatus for dictation purposes, it is frequently necessary to interrupt a recording operation for reviewing the information that has been previously recorded, and then to return to the recording operation. In effecting such reviewing operation, a recording operation of the apparatus is interrupted and the apparatus is changed-over to its rewind mode of operation so as to cause relatively high-speed movement of the tape in the direction counter to its normal forward movement for recording and reproducing operations. The rewind operation is terminated after a time estimated to be sufficient to encompass the recorded information to be reviewed, and the apparatus is then changed-over to its reproducing mode of operation so as to permit review of the previously recorded information. When, during the reviewing or monitoring of the previously recorded information, it is desired to change-over from the reproducing mode of operation to the recording mode of operation, for example, so that the previously recorded information thereafter appearing on the tape may be replaced by new recorded information, it is necessary, with the existing described apparatus, to first actuate the stop push-button for restoring the apparatus to its stop mode, and then to simultaneously actuate the record push-button and the forward push-button for establishing the recording mode of operation. After a portion of the previously recorded information has been thus replaced by new recorded information, it may be desired to effect a so-called cueing operation in which the apparatus is changed-over to its fast-forward mode for rapidly returning the tape to the position at which the recording of information thereon was originally discontinued. When the fast-forward operation has been effective to return the tape to approximately its original position, the fast-forward operation is discontinued and the apparatus is changed-over to its reproducing mode of operation for again monitoring the recorded information and thereby determining precisely the end thereof. At the completion of such cueing operation, it is necessary to further change-over the apparatus to its recording mode of operation so that the recording of information on the tape can be continued. Once again, with the described existing apparatus, when the end of the previously recorded information is located by means of the cueing operation, that is, a reproducing operation following a fast-forward operation, the stop push-button has to be actuated for restoring the apparatus to its stop mode, and then the record and forward push-buttons have to be simultaneously actuated for establishing the recording mode of operation.

It will be apparent from the above that the described existing rescording and/or reproducing apparatus is not ideally suited for dictation or other purposes in which rapid and repeated changes in the operations of the apparatus are required, for example, from a recording operation to a reviewing or cueing operation and then back to a recording operation, such changes in the mode of operation, particularly from the reproducing mode of operation to the recording mode of operation, require frequent and repeated actuations of the push-buttons.

A recording and/or reproducing apparatus for use with tape cassettes has been proposed in which a direct change-over from the reproducing mode of operation to the recording mode of operation is possible following a rewind or fast-forward operation. However, such apparatus employs a complex electrical system including solenoids, relays and the like for permitting the desired direct change-over from the reproducing to the recording mode of operation, and therefore, is relatively expensive so that its popularity is limited.

OBJECTS AND SUMMARY OF THE INVENTION

Accordingly, it is an object of this invention to provide a recording and/or reproducing apparatus which overcomes the above mentioned disadvantages of the existing apparatus of the described type.

More specifically, an object of this invention is to provide a recording and/or reproducing apparatus of the described type which can be rapidly and simply changed-over to its recording mode of operation following a reviewing operation or a cueing operation.

Another object of this invention is to provide a recording and/or reproducing apparatus, as aforesaid, in which, once the recording mode of operation of the apparatus has been established by the simultaneous actuation of the record and forward push-buttons, the record push-button can be freely actuated for reestablishing the recording mode of operation from any other mode of operation of the apparatus until such time as the apparatus is returned to its stop mode by actuation of the stop push-button.

A further object is to provide a recording and/or reproducing apparatus, as aforesaid, which is suitable for dictation purposes, and in which relatively inexpensive and simple mechanisms are employed for facilitating the selection of the various modes of operation of the apparatus.

In accordance with an aspect of this invention, a recording and/or reproducing apparatus comprises a push-button assembly including a forward push-button actuable from a rest position to an active position for establishing a reproducing mode of operation, a record push-button actuable from a rest position to an active position for establishing a recording mode of operation upon disposition of the forward push-button in its active position and a stop push-button actuable from a rest position to an active position for restoring the apparatus to a stop mode, first interlocking means operative to prevent actuation of the record push-button to its active position after the forward push-button has been actuated to its active position and thereby normally inhibiting change-over of the apparatus directly from its reproducing mode of operation to its recording mode of operation, second interlocking means operative in response to establishing of the recording mode of operation to disable the first interlocking means and thereafter permit actuation of said record push-button to its active position with the forward push-button already in the active position of the latter as at the completion of a reviewing or cueing operation, and means responsive to the restoration of the apparatus to its stop mode for disabling the second interlocking means.

The apparatus according to this invention further includes rewind and fast-forward push-buttons selectively actuable from a rest position to an active position for establishing rewind and fast-forward modes of operation, respectively, of the apparatus, and latching means for selectively retaining each of the record, forward, rewind and fast-forward push-buttons in the respective active position following actuation thereof, with such latching means being released as to any one of the record, forward, rewind and fast-forward push-buttons in response to the actuation of the stop push-button. It is a feature of this invention that the aforesaid latching means is released as to the record push-button, but not as to the forward push-button, upon actuation of either the rewind push-button or the fast-forward push-button at a time when the apparatus is in its recording mode, and further that the latching means is inoperative to retain either the rewind or the fast-forward push-button in its active position so long as the forward push-button is in its active position, for example, when the rewind or fast-forward push-button is actuated for initiating a reviewing or cueing operation.

The above, and other objects, features and advantages of this invention, will be apparent in the following detailed description of an illustrative embodiment of the invention which is to be read in connection with the accompanying drawings.

DESCRIPTION OF A PREFERRED EMBODIMENT

Figure 1:
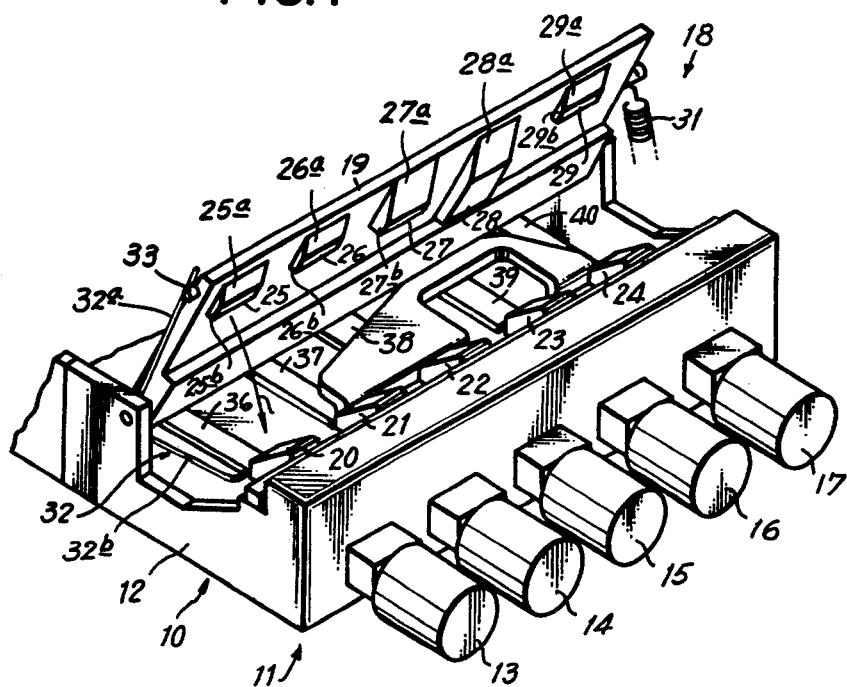
FIG. 1 is a fragmentary perspective view showing a push-button assembly of a recording and/or reproducing apparatus according to an embodiment of this invention, with a latching plate included in the push-button assembly being shown in an elevated or inoperative position for ease of illustration of the details thereof.
Figure 2:
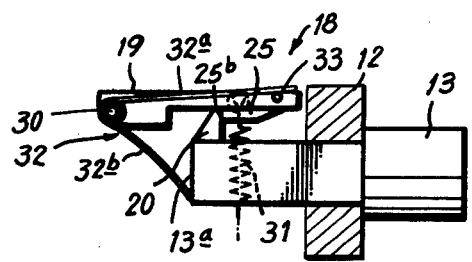
FIG. 2 is a side elevational view of the push-button assembly of FIG. 1, but with the latching plate thereof shown in its operative position.

Referring to the drawings in detail, and initially to FIGS. 1 and 2 thereof, it will be seen that a recording and/or reproducing apparatus 10 according to this invention generally comprises a push-button assembly 11 having a frame 12 in which a record push-button 13, a fast-forward push-button 14, a forward push-button 15, a stop push-button 16 and a rewind push-button 17 are slidably mounted in a laterally extending array. Each of the push-buttons 13–17 is urged, as by a respective spring (not shown), to a forwardly extended rest position, as indicated on FIG. 1, and is adapted to be manually depressed or actuated rearwardly to an active position, for example, as indicated in respect to the record push-button 13 on FIG. 2.

The push-button assembly 11 is further shown to include a latching mechanism 18 primarily constituted by a latching plate 19 extending laterally over the inner or rearwardly directed end portions of push-buttons 13–17. The inner end portions of push-buttons 13–17 are formed with upwardly directed projections 20–24, respectively, which are of substantially the same size and shape, and which extend substantially normal to the directions of movement of the respective push-button between their rest and active positions. Further, as shown particularly on FIG. 1, the underside of latching plate 19 is formed with spaced apart projections 25–29 which are laterally located for engagement with the projections 20–24, respectively. Projections 20,21,22 and 24 associated with record push-button 13, fast-forward push-button 14, forward push-button 15 and rewind push-button 17 constitute keepers which, when engaged by the respective projections 25,26,27 and 29 forming detents on latching plate 19, are effective to retain the respective push-buttons 13,14,15 and 17 in the depressed or active positions of the latter.

In order to function as detents, projections 25,26,27 and 29 include ramp surfaces 25a,26a,27a and 29a, respectively, having at least the forward portion thereof inclined downwardly from latching plate 19 and terminating in shoulders 25b,26b,27b and 29b, respectively. The shoulders 25b,26b, 27b and 29b are in lateral alignment with each other and located intermediate the front and rear edges of latching plate 19 so as to be engageable in front of keepers 20,21,22 and 24, respectively, when push-buttons 13,14,15 and 17 are selectively depressed to their rearward or active positions. The projection 28 at the underside of latching plate 19 also defines a ramp surface 28a having at least its forward portion inclined relative to plate 19, but such ramp surface 28a extends substantially rearwardly of the shoulders 25b,26b,27b and 29b so as to be engaged by projection 23 associated with stop push-button 16 even in the active position of the latter. In other words, no shoulder is provided at the back end of projection 28 for locking or latching stop push-button 16 in its active position.

Latching plate 19 is pivotally mounted, as on a pivot pin or shaft 30, for swinging relative to frame 12 about a lateral axis extending along the rearward edge portion of plate 19. A helical tension spring 31 is connected between latching plate 19 and frame 12 at one end of plate 19 for continuously urging latching plate 19 in the downward direction with a relatively weak force which is insufficient to overcome the frictional resistance to movement of the latching plate in the downward direction resulting from the engagement of shoulder 27b on detent 27 with keeper 22 on forward push-button 15. A torsion spring 32 is disposed adjacent the end of latching plate 19 remote from tension spring 31 and is turnable about pivot pin 30. One arm 32a of torsion spring 32 is engageable downwardly against an abutment 33 on the adjacent end of latching plate 19, and the other arm 32b of the torsion spring is engageable, at its end, by the back end of record push-button 13 in the active position of the latter. Torsion spring 32 is dimensioned so that, when record push-button 13 is in its rest or forward position, the back end 13a of push-button 13 is merely adjacent arm 32b of torsion spring 32 so that the latter is relaxed and its arm 32a merely rests on abutment 33 and does not apply any significant spring force to the latter. However, when record push-button 13 is depressed to its active position, the back end 13a of push-button 13 pushes rearwardly against the end of arm 32b, as shown on FIG. 2, and the other arm 32a of torsion spring 32 is thereby made to apply a relatively strong spring force downwardly against abutment 33 for similarly urging latching plate 19 in the downward direction.

It will be apparent that, as each of the push-buttons 13–17 is depressed rearwardly from its rest position toward its active position, latching plate 19 is displaced upwardly against the relatively weak force of spring 31, or against the relatively strong combined force of springs 31 and 32 in the case of the actuation of record push-button 13, as a result of the projection 20,21,22,23 or 24 of the actuated push-button riding along the inclined portion of the respective ramp surface 25a,26a,27a,28 or 29a. In the apparatus 10 according to this invention, projections 25–29 depend different distances from the lower surface of latching plate 19 so as to cause correspondingly different upward displacements of plate 19 in response to actuation of the respective push-buttons 13–17.

More particularly, projection 28 associated with stop push-button 16 depends a greater distance from latching plate 19 than any of the other projections 25,26,27 and 29 forming detents associated with record push-button 13, fast-forward push-button 14, forward push-button 15 and rewind push-button 17, respectively. Thus, if any of push-buttons 13,14,15 and 17 have been locked or latched in their active positions by engagement of the respective projections 20,21,22 and 24 with the shoulders 25b,26b,27b and 29b, respectively, actuation of stop push-button 16 causes the engageable projections 23 and 28 to effect a sufficiently large upward displacement of latching plate 19 for releasing the latching or locking action as to each of push-buttons 13,14,15 and 17 for permitting the return of the previously actuated push-button or push-buttons to the rest positions thereof. Furthermore, in accordance with this invention, the projection or detent 27 depends from the undersurface of latching plate 19 by a distance greater than the distance that projections or detents 26 and 29 depend from the undersurface of plate 19, and such distance that the detents 26 and 29 depend from the undersurface of plate 19 is, in turn, greater than the distance that the projection or detent 25 depends from the undersurface of plate 19.

It will be seen that, with the above described relation between detents 25,26,27 and 29, when the recording mode of operation of apparatus 10 is established in response to the simultaneous actuation of record push-button 13 and forward push-button 15 to their active positions, such push-buttons 13 and 15 are retained at their active positions by the engagement of their respective projections 20 and 22 with shoulders 25b and 27b, respectively. During such recording operation, actuation of either rewind push-button 17 or fast-forward push-button 14, for example, for initiating a reviewing operation or a cueing operation, respectively, causes an upward displacement of latching plate 19 that is sufficient to release the locking or latching action as to record push-button 13, but not as to forward push-button 15, that is, shoulder 25b is released from keeper 20 while shoulder 27b continues to engage keeper 22. Furthermore, when record push-button 13 is thus released to return to its rest position in response to the actuation of either fast-forward push-button 14 or rewind push-button 17 during a recording operation, only spring 31 continues to act downwardly on latching plate 19. Since the relatively weak force applied by spring 31 to latching plate 19 is insufficient to overcome the frictional resistance to downward movement of plate 19 resulting from the continued engagement of shoulder 27b with projection 22 of the forward push-button 15, latching plate 19 remains in an intermediate position at which shoulders 26b and 29b are at a level above keepers 21 and 24, so that latching mechanism 18 is incapable of latching or locking either the fast-forward push-button 14 or the rewind push-button 17 in the active position of the latter. Accordingly, in a reviewing operation, the rewind mode of operation continues only so long as rewind push-button 17 is manually depressed and, upon the removal of the manually exerted pressure from push-button 17, the latter returns to its rest or forward position and the apparatus is automatically changed-over to its reproducing mode of operation by reason of the fact that forward push-button 15 has remained latched or locked in its active position. Similarly, in a cueing operation, the apparatus remains in its fast-forward mode of operation only so long as push-button 14 is manually depressed and, upon removal of the manually applied pressure from push-button 14, the latter returns to its rest position and the apparatus is automatically changed-over to its reproducing mode of operation by reason of the fact that push-button 15 has continued to be locked or latched in its active position. It will further be seen that, at the completion of a reviewing or cueing operation, the actuation of record push-button 13 to its active position does not cause any upward displacement of latching plate 19 and, therefore, forward push-button 15 remains locked in its active position. As push-button 13 nears its active position, torsion spring 32 is made operative to apply the relatively strong spring force to latching plate 19 for further urging the latter downwardly so as to engage shoulder 25b with keeper 20 and thereby lock or latch record push-button 13 in its active position for establishing the recording mode of operation.

Figure 3:
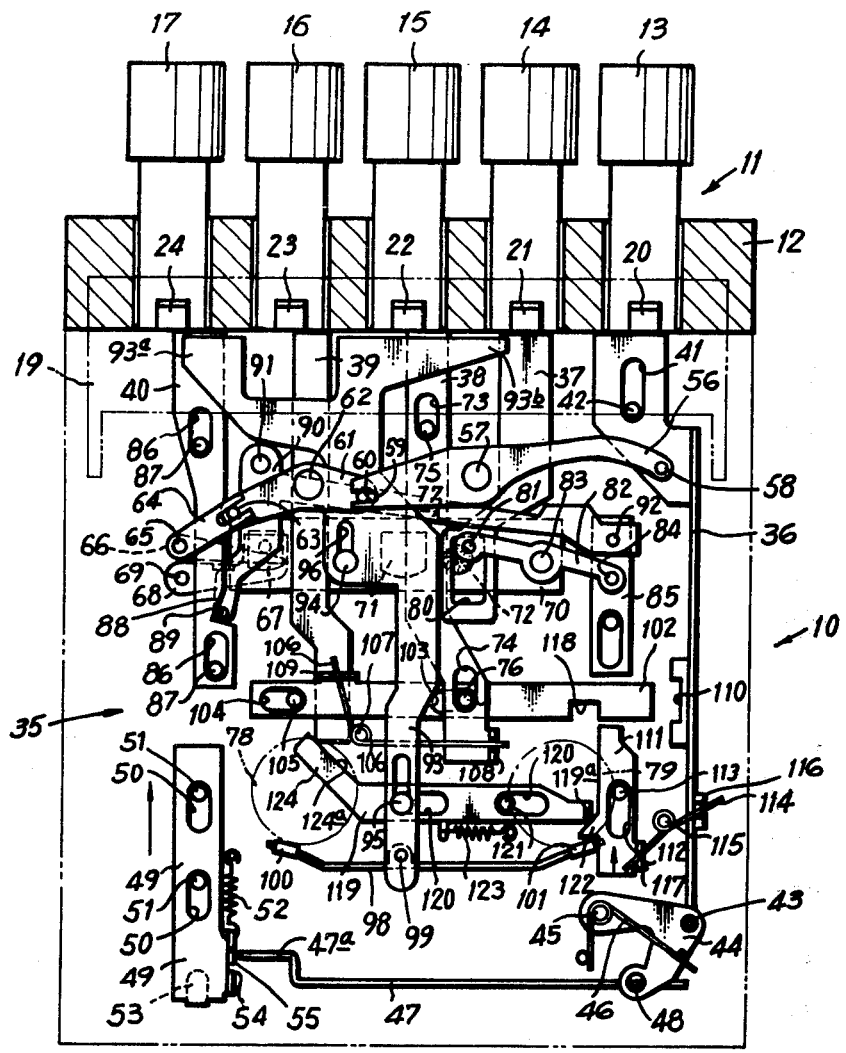
FIG. 3 is a top plan view of the change-over mechanism of the recording and/or reproducing apparatus according to this invention, and which is shown in the condition thereof for the stop mode of the apparatus.

Referring now to FIG. 3, it will be seen that, in the recording and/or reproducing apparatus 10 according to this invention, the previously described push-button assembly 11 is employed for controlling a change-over mechanism 35 which generally includes a record actuating slide 36, a fast-forward actuating slide 37, a forward actuating slide 38, a stop actuating slide 39 and a rewind actuating slide 40.

Figure 5:
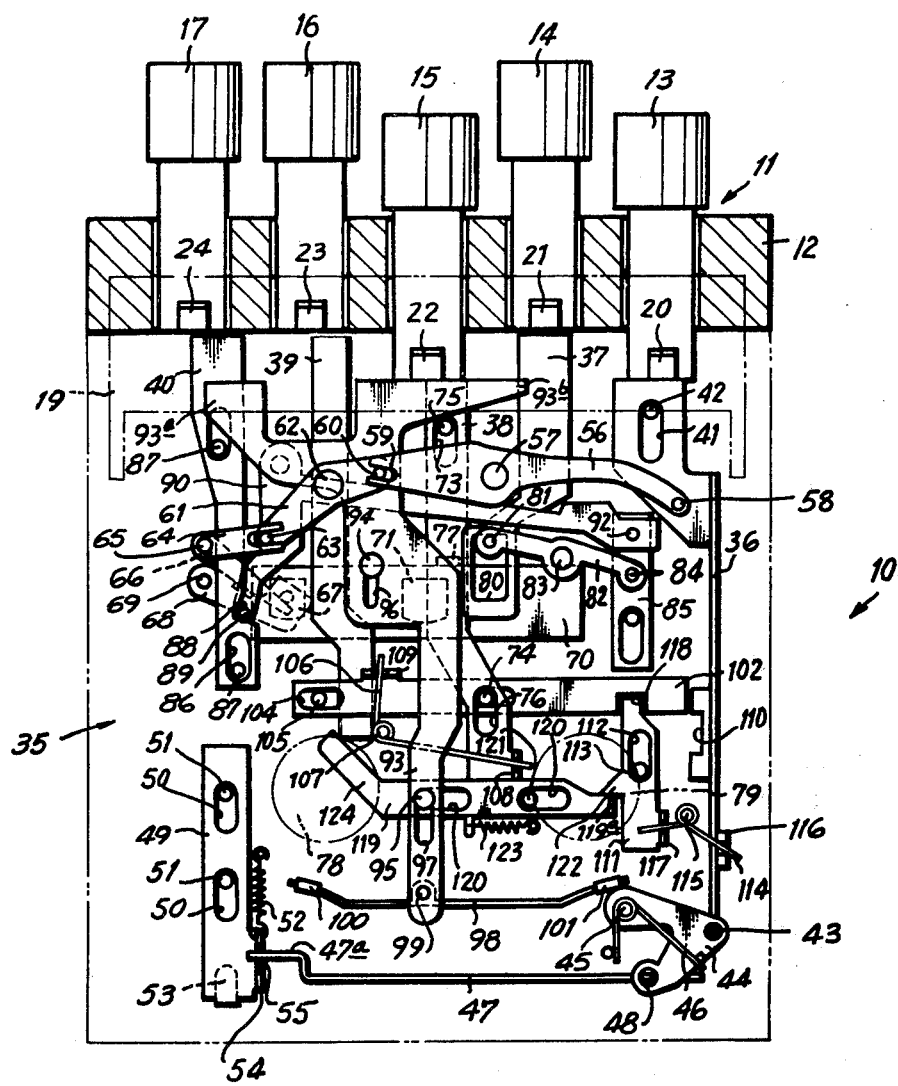

Record actuating slide 36 extends rearwardly from in back of record push-button 13, and the forward end portion of slide 36 has a longitudinally elongated hole 41 receiving a guide pin 42 extending from frame 12 so as to mount slide 36 for longitudinal movement between an inoperative position (FIG. 3) and an operative position (FIG. 5). The back end of slide 36 is pivotally connected, as at 43, to a bellcrank 44 which is turnable on a pivot pin 45 extending from frame 12. A torsion spring 46 acts on bellcrank 44 to urge the latter in the counter-clockwise direction, as viewed on FIG. 3, and thereby to urge record actuating slide 36 in the forward direction for maintaining engagement of its forward end with the back end of record push-button 13. A rod 47 is pivotally connected at one end, as at 48, to bellcrank 44 and is suitably guided for lateral movement, for example, between the positions shown on FIGS. 3 and 5, in response to the turning of bellcrank 44 caused by movement of record actuating slide 36 between its inoperative and operative positions. A detecting slide 49 is mounted for longitudinal sliding movement thereof in the forward and rearward direction relative to frame 12, for example, by means of longitudinally elongated holes 50 in slide 49 receiving guide pins 51 extending from frame 12. A spring 52 is connected between frame 12 and detecting slide 49 for urging the latter forwardly from the position shown in FIG. 3, and the back end of detecting slide 49 is formed with a forwardly directed finger 53.

The apparatus 10 according to this invention is intended for use with conventional cassettes of the type having an aperture in the peripheral wall of the cassette housing, which aperture is initially obstructed by a frangible tab for indicating that signals or information may be recorded on the tape contained in such housing. However, after information has been recorded on the tape and it is desired to retain such recorded information, that is, to prevent the erasing of the previously recorded information and the recording of new information on the tape, the frangible tab is removed from the aperture of the cassette hosing for leaving such aperture exposed or unobstructed.

The detecting slide 49 of change-over mechanism 35 is disposed so that, when a tape cassette (not shown) having its aperture obstructed by the frangible tab is operatively positioned in apparatus 10, finger 53 on detecting slide 49 is engaged by the tab for displacing slide 49 rearwardly against the force of spring 52 to the position shown on FIGS. 3 and 5. On the other hand, if the operatively positioned tape cassette has its aperture unobstructed so as to prevent the recording of new information on the respective tape, finger 53 is able to enter such unobstructed aperture and spring 52 moves detecting slide 49 forwardly from the position shown on FIGS. 3 and 5. In order to permit the change-over of apparatus 10 to its recording mode of operation only when the operatively positioned tape cassette has its aperture obstructed, that is, only when detecting slide 49 is in the position shown on FIGS. 3 and 5, slide 49 has a flange 54 extending from the edge thereof confronting the end 47a of rod 47 which is remote from bellcrank 44. Such flange 54 of slide 49 is formed with an opening 55 which registers with the end 47a of rod 47 only when detecting slide 49 is in the position shown on FIGS. 3 and 5, that is, only when the operatively positioned cassette has an obstructed aperture. When opening 55 is thus made to register with end 47a of rod 47, actuation of record push-button 13 is its active position, and the accompanying rearward displacement of slide 36 to its operative position causes clockwise turning of bellcrank 44 against the force of spring 46 and rod 47 is displaced toward the left so that its end portion 47a enters opening 55 (FIG. 5). However, if the operatively positioned tape cassette has its aperture unobstructed so that finger 53 can enter the same and detecting slide 49 is displaced forwardly from the position shown on FIGS. 3 and 5, flange 54 of the detecting slide confronts the end 47a of rod 47 and thereby blocks movement of rod 47 from the position shown on FIG. 3. Thus, movement of record actuating slide 36 to its operative position is prevented with the result that record push-button 13 cannot be depressed to its active position and the recording mode of operation of the apparatus cannot be established.

In change-over mechanism 35, a connecting lever 56 is pivotally mounted intermediate its ends on a pivot pin 57 and has one end pivotally connected with record actuating slide 36, as at 58, while the other end of lever 56 is forked, as at 59. The forked end 59 of lever 56 receives a pin 60 at an adjacent end of an intermediate lever 61 which is pivotally supported intermediate its end on a pivot pin 62. The end of intermediate lever 61 remote from pin 60 carries a pin 63 engaged in a forked end of an arm 64 which is fixed to an end portion of a turnable shaft 65. In the apparatus 10, an erasing head 67 is mounted on a support arm 68 which is pivotally mounted, as at 69, and urged, for example, by a spring (not shown), in the clockwise direction for moving erasing head 67 rearwardly from its inoperative position (FIG. 3) to its operative position (FIG. 5). In its operative position, erasing head 67 enters the usual window provided in the housing of an operatively positioned cassette for erasing any signals previously recorded on the tape contained in such housing. An actuating arm 66 is fixed on shaft 65 so as to be turnable with arm 64 and is engageable with a suitable abutment on support arm 68 for retaining erasing head 67 in its inoperative position (FIG. 3) so long as record actuating slide 36 is in its inoperative position. However, it will be apparent that, when record actuating slide 36 is moved rearwardly to its operative position (FIG. 5), such movement of slide 36 is effective, through connecting lever 56, intermediate lever 61, arm 64 and shaft 65, to cause turning of actuating arm 66 in the clockwise direction so as to permit rearward movement of erasing head 67 to its operative position.

Figure 4:
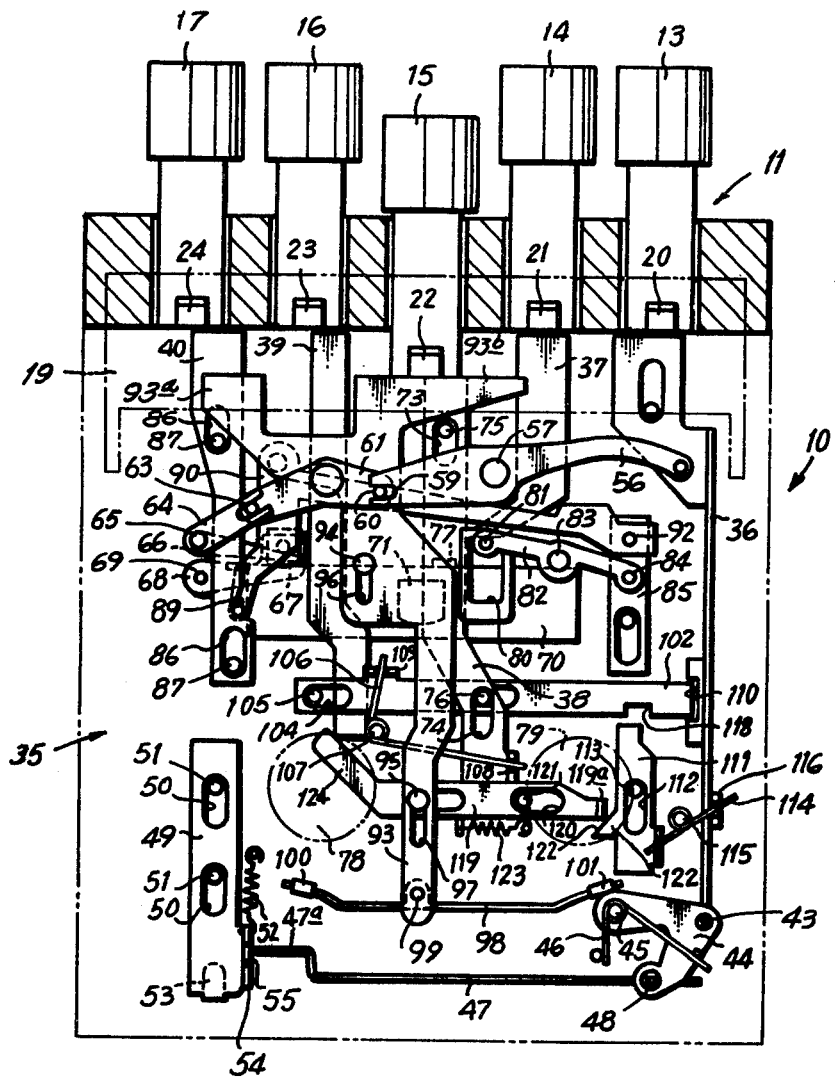
FIGS. 4 and 5 are views similar to that of FIG. 3 but respectively showing the change-over mechanism in the conditions thereof for the reproducing mode of operation and recording mode of operation.

The apparatus 10 according to this invention is further shown on FIG. 3 to have a head carriage 70 carrying the usual recording-reproducing head 71 and a pinch roller 72, and being suitably mounted for movement between a forward inoperative position (FIG. 3) and a rearward operative position (FIGS. 4 and 5). In such operative position of carriage 70, head 71 enters a window in an operatively positioned tape cassette for recording or reproducing signals on the tape therein while pinch roller 72 also enters a window in the tape cassette for cooperating with a capstan (not shown) in driving the tape in the forward direction at the normal relatively slow speed employed for recording and reproducing operations.

As is shown, forward actuating slide 38 extends rearwardly from in back of forward push-button 15 and has longitudinally elongated openings 73 and 74 receiving guide pins 75 and 76 by which slide 38 is mounted for longitudinal movement between a forward inoperative position (FIG. 3) and a rearward operative position (FIGS. 4 and 5) in response to actuation of forward push-button 15 from its rest position to its active position. A lug 77 (shown in broken lines) is provided on slide 38 and is engageable against head carriage 70 for moving the latter to its operative position in response to movement of forward actuating slide 38 to the operative position of the latter.

The apparatus 10 according to this invention is further shown in broken lines to have the usual reel drive tables 78 and 79 which are adapted to be rotatably coupled with the supply and takeup reels of a tape cassette when the latter is operatively positioned in the apparatus. It will be understood that, in response to movement of forward actuating slide 38 to its operative position, a conventional reel drive mechanism (not shown) is made operative to rotate reel drive table 79 in the direction for winding the tape on the takeup reel at a speed commensurate with the driving of the tape by pinch roller 72 and the associated capstan during recording and reproducing operations of apparatus 10.

The fast-forward slide 37 is shown to extend rearwardly from in back of fast-forward push-button 14 and is suitably mounted for longitudinal sliding movement from an inoperative forward position (FIG. 3) to a rearwardly displaced operative position in response to actuation of push-button 14 from its rest position to its active position. The rear end portion of fast-forward actuating slide 37 is shown to have a longitudinally elongated cutout 80 which loosely receives a roller 81 at one end of a connecting lever 82. Lever 82 is pivotally mounted substantially at its center, as at 83, and the end of lever 82 remote from roller 81 is pivotally connected, as at 84, with an idler operating slide 85. Idler operating slide 85 is suitably mounted for longitudinal sliding movement so as to control a conventional idler change-over mechanism (not shown) of the apparatus 10. It will be appreciated that, when fast-forward actuating slide 37 is moved rearwardly to its operative position in response to actuation of fast-forward push-button 14 to its active position, the forward end edge of cutout 80 acts against roller 81 for effecting angular displacement of connecting lever 82 in the counterclockwise direction. Such angular displacement of lever 82, produces a predetermined forward displacement of idler operating slide 85 from the position shown on FIG. 3 with the result that the associated idler change-over mechanism effects relatively high speed rotation of reel drive table 79 in the direction for winding the tape on the associated takeup reel and thereby causing the high speed travel of the tape from the supply reel to the takeup reel in the operatively positioned cassette.

Figure 6:
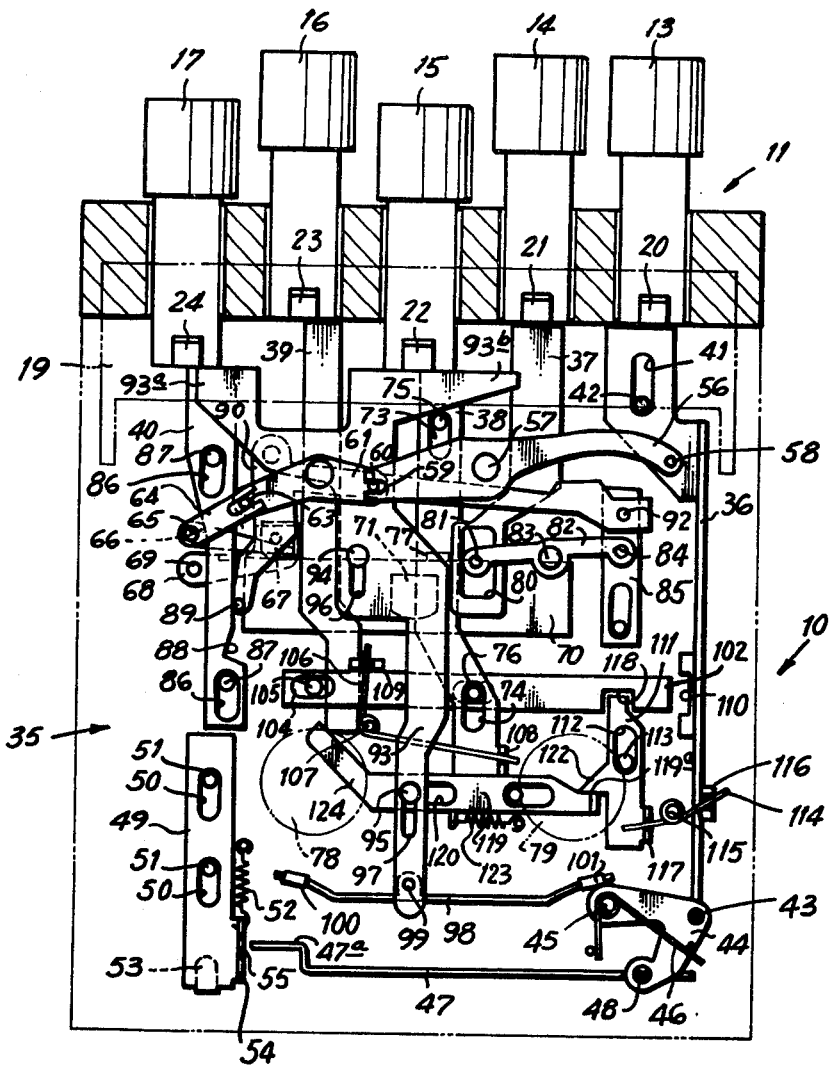
FIG. 6 is another view similar to that of FIG. 3, but showing the condition of the change-over mechanism for a reviewing operation, that is, when a rewind mode of operation is established following a recording mode of operation.

The rewind actuating slide 40 is shown to extend rearwardly from in back of rewind push-button 17 and to be mounted for sliding longitudinal movement, as by slots 86 slidably receiving mounting pins 87, from an inoperative position (FIG. 3) to an operative position (FIG. 6) in response to actuation of rewind push-button 17 to its active position. A triangular cutout 88 is formed in a longitudinal edge portion of slide 40 and receives a follower pin 89 when slide 40 is in its inoperative position (FIG. 3). The follower pin 89 is mounted at the end of a relatively short arm of a bellcrank 90 which is pivotally mounted, as at 91, and which has the end of its other relatively long arm pivotally connected, as at 92, to idler operating slide 85. Thus, when rewind actuating slide 40 is displaced rearwardly from its inoperative position to its operative position in response to actuation of push-button 17 to its active position (FIG. 6), follower pin 89 rides out of cutout 88 so as to turn bellcrank 90 in the counter-clockwise direction for effecting forward displacement of idler operating slide 85. By reason of the disparity in the lengths of the arms of bellcrank 90, the forward displacement of idler operating slide 85 resulting from actuation of rewind push-button 17 may be different from the forward displacement of slide 85 caused by the actuation of fast-forward push-button 14. In response to the displacement of idler operating slide 85 caused by actuation of rewind push-button 17, the conventional idler change-over mechanism effects relatively high speed rotation of reel drive table 78 in the direction for winding the tape on the associated supply reel and thereby causing the high speed travel of the tape from the takeup reel back to the supply reel in the operatively positioned cassette.

The change-over mechanism 35 is further shown to include a brake-releasing slide 93 which is mounted, as by guide pins 94 and 95 slidably received in slots 96 and 97, respectively, and which has splayed forward portions 93a and 93b. The forward portion 93a of slide 93 extends in back of, and is engageable by the back end of rewind push-botton 17, while the other forward portion 93b extends in back of and is engageable by the back ends of fast-forward push-button 14 and forward push-button 15. A brake lever 98 is pivotally mounted intermediate its ends, as at 99, on the back end portion of brake-releasing slide 93, and the opposite ends of brake lever 98 carry brake pads 100 and 101 which are frictionally engageable with peripheral surfaces on reel drive tables 78 and 79, respectively, in the stop mode of apparatus 10 (FIG. 3). However, when any one of push-buttons 14, 15 and 17 is actuated to its active position, brake-releasing slide 93 is displaced rearwardly, for example, as shown on FIGS. 4, 5 and 6, so as to move brake pads 100 and 101 away from reel drive tables 78 and 79, respectively, and thereby free the latter for rotation.

In accordance with the present invention, the above described change-over mechanism 35 is provided with a first interlocking means operative to prevent actuation of record push-button 13 to its active position after forward push-button 15 has been actuated to the active position of the latter so as to normally inhibit change-over of apparatus 10 directly from its reproducing mode of operation to its recording mode of operation. In the illustrated embodiment of the invention, such first interlocking means includes a first interlocking slide 102 extending laterally in respect to record actuating slide 36 and being mounted for longitudinal sliding movement, for example, by means of slots 103 and 104 in slide 102 which slidably receive guide pin 76 and an additional guide pin 105, respectively. A torsion spring 106 is pivotally mounted intermediate its arms on a fixed pin 107 and has the ends of its arms respectively received in apertured lugs 108 and 109 formed on forward actuating slide 38 and on interlocking slide 102, respectively. Thus, when forward actuating slide 38 is in its inoperative position (FIG. 3) spring 106 displaces first interlocking slide 102 toward the left to its releasing position in which the end of interlocking slide 102 adjacent record actuating slide 36 is spaced substantially from the latter. However, when forward actuating slide 38 is moved rearwardly to its operative position (FIG. 4), spring 106 urges first interlocking slide 102 toward the right to a locking position (FIG. 4). In such locking position, the end of slide 102 adjacent record actuating slide 36 is engageable in a laterally opening keeper recess 110 formed in the adjacent side surface of slide 36 and being positioned along the latter so as to register with slide 102 only when record actuating slide 36 is in its inoperative position. It will be apparent that, so long as first interlocking slide 102 is engaged in keeper recess 110 in response to establishing of the reproducing or playback mode of operation of apparatus 10, as shown on FIG. 4, record actuating slide 36 is locked in its inoperative position with the result that record push-pbutton 13 cannot be depressed for changing-over apparatus 10 directly from its reproducing mode of operation to its recording mode of operation.

Further, in accordance with this invention, the change-over mechanism 35 is provided with second interlocking means operative, in response to establishing of the recording mode of operation of apparatus 10, to disable the previously first interlocking means and thereafter permit actuation of the record push-button 13 to its active position with the forward push-button 15 already in the active position of the latter. In the illustrated embodiment of the invention, such second interlocking means is shown to include a second interlocking slide 111 mounted, as by a slot 112 therein receiving a fixed guide pin 113, for longitudinal sliding movement parallel with record actuating slide 36, that is, in a direction substantially at right angles to the longitudinal sliding movement of first interlocking slide 102. A torsion spring 114 is pivoted, intermediate its arms, on a fixed pivot 115 and has the ends of its arms respectively received in a fork 116 on record actuating slide 36 and in an apertured lug 117 on second interlocking slide 111. Thus, when record actuating slide 36 is in its forward inoperative position (FIG. 3), second interlocking slide 111 is urged rearwardly to its releasing position in which the forward end portion of slide 111 is spaced from first interlocking slide 102 for avoiding any interference with the movement of slide 102 from the releasing position to the locking position of the latter. On the other hand, when record actuating slide 36 is displaced rearwardly to its operative position (FIG. 5) in response to the actuation of record push-button 13 simultaneously with, or in advance of the actuation of forward push-button 15 for establishing the recording mode of operation of apparatus 10, spring 114 effects forward displacement of second interlocking slide 111 to its locking position (FIG. 5) in which the forward end of slide 111 enters a keeper recess 118 opening rearwardly in a longitudinal edge of slide 102, that is, opening laterally in respect to the direction of movement of first interlocking slide 102. The keeper recess 118 in slide 102 is located along the latter so as to be registered with the adjacent or forward end of second interlocking slide 111 for receiving the latter when interlocking slide 102 is at a position intermediate its releasing and locking position. Thus, upon engagement of second interlocking slide 111 in keeper recess 118 of first interlocking slide 102 (FIGS. 5 and 6), slide 102 is prevented from moving to its locking position even though torsion spring 106 is urging slide 102 toward its locking position in response to the operative positioning of forward actuating slide 38.

Further, in accordance with this invention, holding means in the form of a slide 119 is engageable with second interlocking slide 111 upon movement of the latter to its locking position for thereafter holding slide 111 in its locking position irrespective of the position of record actuating slide 36, until such time as stop push-button 16 is actuated for releasing holding slide 119 from second interlocking slide 111. More particularly, as shown, holding slide 119 has longitudinal slots 120 receiving guide pin 95 and another guide pin 121, respectively, so as to mount slide 119 for longitudinal sliding movement in the lateral direction, that is, at right angles to the direction of sliding movement of second interlocking slide 111. The end of holding slide 119 adjacent interlocking slide 111 has a flange 119a thereon which, in the locking position of second interlocking slide 111, is engageable in back of a triangular nose 122 projecting laterally from slide 111 for holding the latter in its locking position. A spring 123 acts on holding slide 119 for urging the latter toward the right, that is, in the direction for engaging flange 119a with nose 122.

In accordance with this invention, the second interlocking means is disabled, that is, flange 119a on holding slide 119 is released from nose 122 so as to permit spring 114 to return second interlocking slide 111 to its releasing position (FIG. 3) in response to the restoration of apparatus 10 to its stop mode upon the actuation of stop push-button 16. In order to achieve the foregoing, the stop actuating slide 39 extends rearwardly from in back of stop push-button 16 and is suitably mounted for longitudinal sliding movement. The back end of stop actuating slide 39 is disposed adjacent an angled end portion 124 provided on holding slide 119 at the end thereof remote from flange 119a and which defines an edge surface 124a extending obliquely in respect to the direction of movement of holding slide 119. Thus, when stop push-button 16 is depressed to its active position, the resulting rearward movement of stop actuating slide 39 causes the back end of the latter to ride against oblique edge surface 124a for moving holding slide 119 toward the left against the force of spring 123 from the position shown on FIGS. 5 and 6, whereby to release flange 119a from nose 122 and permit return of second interlocking slide 111 to its releasing position with the return of record actuating slide 36 to its inoperative position.

The above described recording and/or reproducing apparatus 10 according to this invention operates as follows:

Starting with the apparatus 10 in its stop mode (FIG. 3) and assuming that a tape cassette is operatively positioned in the apparatus and has its aperture obstructed so as to dispose detecting slide 49 in the illustrated position for permitting recording as well as reproducing operations, actuation of forward push-button 15 to its active position causes change-over of the apparatus to its reproducing or playback mode of operation (FIG. 4). When push-button 15 is depressed or actuated to its active position, keeper 22 thereon moves in back of, and is engaged by shoulder 27b on detent 27 of latching plate 19 for locking forward push-button 15 in its active position. In the course of the depressing or actuation of push-button 15 to its active position, forward actuating slide 38 and brake releasing slide 93 are moved rearwardly thereby. The rearward movement of forward actuating slide 38 is transmitted through abutment 77 to head carriage 70 which is thereby displaced to its operative position for engaging recording-reproducing head 71 and the pinch roller on carriage 70 with the tape in the operatively positioned cassette. The rearward movement of brake releasing slide 93 causes similar movement of brake lever 98 for moving brake pads 100 and 101 away from reel drive tables 78 and 79. Further, in the course of the rearward movement of forward actuating slide 38 to its operative position, torsion spring 106 displaces first interlocking slide 102 laterally toward the right to its locking position. Since record actuating slide 36 is in its inoperative position, second interlocking slide 111 is held by spring 114 in its releasing position so as to avoid interference with the movement of first interlocking slide 102 to its locking position, and keeper recess 110 of record actuating slide 36 is disposed to receive the adjacent end of first interlocking slide 102 in the locking position of the latter. Therefore, in response to actuation of forward push-button 15 to its active position, the reproducing or playback mode of operation of apparatus 10 is established and, by reason of the engagement of first interlocking slide 102 in keeper recess 110 of record actuating slide 36, the latter is locked in its inoperative position to prevent actuation of record push-button 13 for directly changing-over apparatus 10 from its reproducing mode of operation to its recording mode of operation.

When it is desired to change-over apparatus 10 from the reproducing mode of operation to the recording mode of operation in the case where the reproducing mode has first been established, as above, it is necessary to restore the apparatus to its stop mode from its reproducing mode by actuation of stop push-button 16 prior to the change-over to the recording mode operation. In response to actuation of stop push-button 16, projection 23 thereon cooperates with ramp surface 28a on the projection 28 of latching plate 19 for displacing the latter upwardly so as to release detent 27 from projection 22 on forward push-button 15 and thereby permit return of the latter to its forward or rest position. During such return of forward push-button 15 to its rest position, forward actuating slide 38 and brake-releasing slide 93 are similarly moved forwardly for returning head carriage 70 to its inoperative position and displacing first interlocking slide 102 to its releasing position, and for reengaging brake pads 100 and 101 with reel drive tables 78 and 79, respectively. With apparatus 10 thus restored to its stop mode (FIG. 3), the apparatus can be changed-over to its recording mode of operation by the simultaneous actuation of record push-button 13 and forward push-button 15, or by the actuation of record push-button 13 followed by the actuation of forward push-button 15 with record push-button 13 being manually held in its active position until forward push-button 15 has attained its active position. When push-button 13 and 15 arrive at their active positions, keepers 20 and 22 thereon engage in back of detents 25 and 27, respectively, of latching plate 19 which is strongly urged downwardly by springs 31 and 32 for locking or latching push-buttons 13 and 15 in their active positions. In response to the actuation of record push-button 13, record actuating slide 36 is moved to its operative position and, in the course of such movement, keeper recess 111 of slide 36 is moved rearwardly in respect to first interlocking slide 102. Further, in the course of the rearward movement of record actuating slide 36 to its operative position, spring 114 urges second interlocking slide 111 forwardly toward its locking position. Accordingly, as forward actuating slide 38 is moved rearwardly to its operative position in response to the actuation of forward push-button 15, the resulting movement of first interlocking slide 102 toward its locking position under the urging of torsion spring 106 is interrupted by the engagement of second locking slide 111 in keeper recess 118 of first interlocking slide 102. Furthermore, when second interlocking slide 111 attains its locking position in keeper recess 118 for disabling the first interlocking slide 102, holding slide 119 is urged by spring 123 to engage in back of nose 122 on slide 111 for holding or retaining the latter in its locking position. In response to the movement of forward actuating slide 38, head carriage 70 is moved to its operative position for operatively positioning the head 71 and pinch roller carried thereby, while the movement of recording actuating slide 36 to its operative position is transmitted, by way of levers 56 and 61, arm 64 and shaft 65, to actuating arm 66 for permitting support arm 68 to move erasing head 67 to its operative position, as shown on FIG. 5. Further, the rearward movement of brake releasing slide 93 in response to actuation of forward push-button 15 disengages brake shoes 100 and 101 from reel drive tables 78 and 79 with the result that apparatus 10 is changed-over to its recording mode of operation.

At any time during a recording operation, a review operation of apparatus 10 can be initiated simply by actuating or depressing rewind push-button 17 to its active position. When rewind push-button 17 is depressed, keeper 24 thereon cooperates with the ramp surface 29a of the respective detent 29 to upwardly displace latching plate 19 by a relatively small distance that is sufficient to disengage detent 25 from keeper 20 on record push-button 13 but insufficient to disengage detent 27 from keeper 22 on forward push-button 15. Thus, recod push-button 13 is released to return to its forward rest position and the force of torsion spring 32 is removed from latching plate 19, while shoulder 27b of detent 27 continues to engage keeper 22 of forward push-button 15 for retaining the latter in its active position. The continued frictional engagement of shoulder 27b with keeper 22 is sufficient to resist downward displacement of latching plate 19 by the weak force of spring 31 that continues to act on the latching plate. Accordingly, latching plate 19 remains at the intermediate or partially raised position to which it was displaced in response to the actuation of rewind push-button 17 with the result that keeper 24 on push-button 17 is not engaged by shoulder 29b of detent 29 and, accordingly, rewind push-button 17 is not locked or latched in its active position.

So long as rewind push-button 17 is manually held in its active position (FIG. 6) rewind actuating slide 40 is rearwardly displaced thereby to its operative position and the cutout 88 thereof moves away from follower pin 89 on bellcrank 90 so that the latter is turned to displace idler operating slide 85 to the position in which the conventional idler change-over mechanism effects relatively high speed rotation of reel drive table 78. Further, as shown on FIG. 6, upon the actuation of rewind push-button 17 for initiating a review operation, brake-releasing slide 93 remains in its rearwardly displaced position for separating brake pads 100 and 101 from reel drive tables 78 and 79. Thus, so long as reqind push-button 17 is manually held in its active position, the tape in an operatively positioned cassette is made to travel at high speed from the takeup reel back to the supply reel.

It will be noted that, although record push-button 13 is released to return to its rest position and forward push-button 15 remains locked in its active position upon actuation of rewind push-button 17 for initiating a reviewing operation, the return of record actuating slide 36 to its inoperative position and the consequent urging of second interlocking slide 111 to its releasing position by torsion spring 114 is blocked by the continued engagement of holding slide 119 in back of nose 122 on second interlocking slide 111. Therefore, although keeper recess 110 on record actuating slide 36 again registers with first interlocking slide 102, the engagement of second interlocking slide 111 in keeper recess 118 of first interlocking slide 102 prevents movement of the latter to its locking position in keeper recess 110 under the urging of torsion spring 106.

When the high speed travel of the tape from the takeup reel back to the suppoy reel has continued for a time estimated to be sufficient for positioning adjacent head 71 that portion of the tape at which the reviewing or monitoring of the previously recorded information is to be commenced, the manual pressure applied to push-button 17 for holding the latter in its active position is removed therefrom and push-button 17 returns to its rest position. In response to such return of push-button 17 to its rest position, rewind actuating slide 40 moves forwardly to its inoperative position and follower pin 89 on bellcrank 90 moves into cutout 88 so as to rock bellcrank 90 for displacing idler operating slide 85 back to its original position. Since forward push-button 15 remains locked in its active position upon return of rewind push-button 17 to its rest position, apparatus 10 is changed-over from its rewind mode of operation to its reproducing or playback mode of operation and the information previously recorded on the tape is reproduced for reviewing or monitoring the same. During such reviewing or monitoring of the information recorded on the tape, second interlocking slide 111 remains in its locked position, that is, engaged in keeper recess 118 of first interlocking slide 102 for preventing movement of the latter to its locking position. Accordingly, at any time during the reviewing or monitoring of the previously recorded information, record push-button 13 can be actuated to move record actuating slide 36 to its operative position and thereby change-over apparatus 10 from its reproducing mode of operation directly to its recording mode of operation, for example, for thereafter replacing the previously recorded information with new recorded information. When record push-button 13 is actuated or depressed to its active position at the conclusion of a reviewing operation, torsion spring 32 is again made to act strongly on latching plate 19 so that the latter is further displaced downwardly for engaging detent 25 with keeper 20 and thereby locking or latching record push-button 13, as well as forward push-button 15, in their active positions for returning the apparatus to its normal recording mode of operation.

At any time that apparatus 10 is in its recording mode of operation, stop push-button 16 may be actuated to restore the apparatus to its stop mode. In response to actuation of stop push-button 16, its projection 23 cooperates with ramp surface 28a of the respective projection 28 on latching plate 19 for displacing the latter upwardly so as to disengage detents 25 and 27 from keepers 20 and 22 of record push-button 13 and forward push-button 15, with the result that push-buttons 13 and 15 return to their rest positions and record actuating slide 36, forward actuating slide 38 and brake-releasing slide 93 are moved forwardly. Further, stop actuating slide 39 is displaced rearwardly to its operative position in response to actuation of stop-push-button 16 and the back end of slide 19 rides against the oblique edge surface 124a on holding slide 119 for displacing the latter toward the left against the force of spring 123 and thereby disengaging flange 119a of holding slide 119 from nose 122 on second interlocking slide 111. By reason of the foregoing, the return to record actuating slide 36 to its inoperative position is effective through torsion spring 114 to move second interlocking slide 111 to its releasing position, that is, to withdraw slide 111 from engagement in keeper recess 118 of first interlocking slide 102. Thus, slide 102 is free to be returned to its releasing position by spring 106 in response to the return of forward actuating slide 38 to its inoperative position and the stop mode of apparatus 10 is established, as shown on FIG. 3.

It will also be apparent that, with apparatus 10 in its recording mode of operation (FIG. 5), a so-called cueing operation of the apparatus can be initiated merely by actuation of fast-forward push-button 14. As in the case of the actuation of rewind push-button 17 for initiating a reviewing operation, the actuation of fast-forward push-button 14 for initiating a cueing operation from a recording operation causes latching mechanism 18 to release only record push-button 13 for return to its rest position, while forward push-button 15 remains latched in its active position and no locking or latching action is obtained in respect to the depressed fast-forward push-button 14. Further, as in the case of the previously described reviewing operation, holding slide 119 acts to retain second interlocking slide 111 in its locking position, that is, engaged in keeper recess 118 of first interlocking slide 102, so that slide 102 is disabled or cannot move to its locking position in keeper recess 110 when record actuating slide 36 is returned to its inoperative position. Accordingly, after the fast-forward operation has proceeded for a time estimated to be sufficient for the advance of the tape to a desired position thereon, the manual pressure employed for holding fast-forward push-button 14 in its active position is removed from the latter and, in response to the resulting return of push-button 14 to its rest position, apparatus 10 is changed-over to its reproducing or playback mode of operation. During the following reproducing operation, record push-button can be again actuated to, and locked in its active position for changing-over apparatus 10 from the reproducing mode of operation to the recording mode of operation.

From the foregoing, it will be apparent that the apparatus 10 according to this invention can be changed-over directly from its reproducing mode of operation to the recording mode of operation in the course of either a reviewing operation or a cueing operation initiated with the apparatus in its recording mode of operation. Further, it will be seen that, with apparatus 10 initially in its reproducing mode of operation (FIG. 4) the actuation of either fast-forward push-button 14 or rewind push-button 17 is effective to change-over the apparatus to either its fast-forward mode of operation or its rewind mode of operation, respectively. In the foregoing situation, forward push-button 15 remains latched in its active position and no locking action is exerted on the actuated fast-forward push-button 14 or rewind push-button 17. Thus, when starting with the apparatus 10 in its reproducing or playback mode of operation, the fast-forward operation or rewind operation obtained by actuation of push-button 14 or 17, respectively, continues only so long as such push-button 14 or 17 is manually held in its active position. Upon the release of the fast-forward push-button 14 or the rewind push-button 17, the fast-forward or rewind operation is terminated and the apparatus 10 is automatically returned to its reproducing or playback mode of operation.

By reason of the foregoing operating characteristics of apparatus 10 according to this invention, such recording and/or reproducing apparatus is ideally suited for dictation purposes as change-over of the apparatus between its several modes of operation can be rapidly obtained with minimal actuations of push-button assembly 11.

It will be understood that the recording and/or reproducing apparatus 10 may also be operated in the normal manner, that is, with the apparatus being restored to its stop mode each time it is desired to change-over the apparatus from one mode of operation to another mode of operation. Thus, for example, with apparatus 10 in either its reproducing mode of operation (FIG. 4) or its recording mode of operation (FIG. 5) stop push-button 16 may be actuated to restore the apparatus to its stop mode (FIG. 3). With the apparatus thus restored to its stop mode, either fast-forward push-button 14 or rewind push-button 17 may be actuated for changing-over apparatus 10 to its fast-forward mode of operation or to its rewind mode of operation, respectively. When the apparatus is thus changed-over to its fast-forward mode of operation or rewind mode of operation from the stop mode, latching mechanism 18 is effective to lock the actuated fast-forward push-button 14 or the actuated rewind push-button 17 in its active position, with the result that the fast-forward operation or rewind operation is thereafter only terminated by the actuation of stop push-button 16 for restoring the apparatus to its stop mode. After such fast-forward operation or rewind operation terminated by actuation of stop push-button 16, forward push-button may be actuated to change-over the apparatus to its reproducing mode of operation and, in that case, change-over of apparatus 10 from the reproducing mode of operation to the recording mode of operation requires the actuation of stop-push-button 16 for restoring the apparatus to its stop mode from the reproducing mode of operation, and then the simultaneous actuation of record push-button 13 and forward push-button 15 for changing-over the apparatus from its stop mode to the recording mode of operation.

Although an illustrative embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A recording and/or reproducing apparatus comprising:

a push-button assembly including a forward push-button actuable from a rest position to an active position for establishing a reproducing mode of operation of the apparatus, a record push-button actuable from a rest position to an active position for establishing a recording mode of operation of the apparatus upon disposition of said forward push-button in said active position of the latter, and a stop push-button actuable from a rest position to an active position for restoring the apparatus to a stop mode;

first interlocking means operative to prevent actuation of said record push-button to its active position after said forward push-button has been actuated to said active position of the latter and thereby normally inhibiting change-over of the apparatus directly from its reproducing mode of operation to its recording mode of operation;

second interlocking means operative in response to establishing of said recording mode of operation to disable said first interlocking means and thereafter permit actuation of said record push-button to its active position with said forward push-button already in said active position of the latter; and means responsive to the restoration of the apparatus to said stop mode thereof for disabling said second interlocking means.

2. A recording and/or reproducing apparatus according to claim 1; further comprising a record actuating slide movable from an inoperative position to an operative position with the actuation of said record push-button from said rest position to said active position of the latter; and in which said first interlocking means includes a first interlocking slide urged to locking and releasing positions thereof in response to the dispostion of said forward push-button in said active and rest positions, respectively, of the latter, and engaging means on said record actuating slide engageable by said first interlocking slide when the latter is displaced to said locking position thereof with said record actuating slide in said inoperative position of the latter so as to prevent actuation of said record push-button to its active position.

3. A recording and/or reproducing apparatus according to claim 2; in which said engaging means on the record actuating slide defines a keeper recess opening laterally in respect to the direction of movement of said record actuating slide between said inoperative and operative positions of the latter, said first interlocking slide is movable between said locking and releasing positions thereof in a direction substantially at right angles to said direction of movement of said record actuating slide, and an end of said first interlocking slide is received in said keeper recess when said first interlocking slide is displaced to said locking position with said record actuating slide in said inoperative position.

4. A recording and/or reproducing apparatus according to claim 2; in which said second interlocking means includes a second interlocking slide urged to locking and releasing positions thereof in response to the disposition of said record actuating slide in said operative and inoperative positions, respectively, of the latter, engaging means on said first interlocking slide engageable by said second interlocking slide when the latter is displaced to said locking position thereof with said first interlocking slide in said releasing position of the latter for holding said first interlocking slide in said releasing position thereof against the urging of said first interlocking slide to said locking position thereof in response to a subsequent actuation of said forward push-button to its active position, and holding means engageable with said second interlocking slide in said locking position of the latter for thereafter holding said second interlocking slide in said locking position thereof irrespective of the position of said record actuating slide; and in which said means for disabling said second interlocking means includes a stop actuating slide operative to release said holding means from said second interlocking slide in response to actuation of said stop push-button to said active position of the latter.

5. A recording and/or reproducing apparatus according to claim 4; in which said engaging means on said first interlocking slide defines a keeper recess opening laterally in respect to the direction of movement of said first interlocking slide between said locking and releasing positions, said second interlocking slide is movable between said locking and releasing positions thereof in a direction substantially at right angles to said direction of movement of said first interlocking slide, and an end of said second interlocking slide is received in said keeper recess of said second interlocking slide when the latter is displaced to said locking position thereof with said first interlocking slide in said releasing position of the latter.

6. A recording and/or reproducing apparatus according to claim 5; in which said holding means includes a nose extending laterally from said second interlocking slide in respect to the direction of movement of the latter between its locking and releasing positions, and a holding slide movable in a direction substantially at right angles to said direction of movement of the second interlocking slide and being spring urged toward the latter for engaging said nose in said locking position of said second interlocking slide, said holding slide having a surface thereon extending obliquely in respect to said direction of movement of the holding slide and being engageable by said stop actuating slide for movement of said holding slide away from said second interlocking slide in response to said actuation of the stop push-button to said active position thereof.

7. A recording and/or reproducing apparatus according to claim 4; further comprising a forward actuating slide movable from an inoperative position to an operative position with the actuation of said forward push-button from said rest position to said active position of the latter, and first and second spring means respectively connecting said forward actuating slide with said first interlocking slide and said record actuating slide with said second interlocking slide.

8. A recording and/or reproducing apparatus according to claim 1; in which said push-button assembly further includes at least one additional push-button actuable from a rest position to an active position for establishing another respective mode of operation of the apparatus, a latching plate having detents respectively corresponding to said record, forward and other push-buttons, keepers on said record, forward and additional push-buttons and each being engageable by the respective detent on said latching plate when the respective push-button is actuated to its active position for retaining said respective push-button in said active position thereof, and means yieldably urging said latching plate in one direction for effecting the engagement of said detents with the respective keepers, said latching plate being movable in the opposite direction for releasing said detents from the respective keepers, said detents and the respective keepers being shaped to effect respective displacements of said latching plate in said opposite direction in the course of the movement of the respective push-button to said active position thereof, said displacements of the latching plate in response to movement of said forward and additional push-buttons, respectively, to their respective active positions being greater than said displacement of the latching plate in response to movement of said record push-button to its active position so that said detent corresponding to said record push-button is released from the respective keeper upon actuation of any one of said forward and additional push-buttons to its active position.

9. A recording and/or reproducing apparatus according to claim 8; in which said latching plate and said stop push-button have engageable means thereon effecting a displacement of said latching plate in said opposite direction in response to actuation of said stop push-button to its active position which is greater than any of said displacements of the latching plate effected by said detents and respective keepers so that each of said detents corresponding to said forward, record and additional push-buttons is released from the respective keeper upon actuation of said stop push-button to its active position.

10. A recording and/or reproducing apparatus according to claim 9; in which each of said keepers is constituted by a projection extending substantially normal to the direction of movement of the respective push-button between its rest and active positions, and each of said detents includes a ramp surface having at least a portion thereof inclined relative to said latching plate and terminating in a shoulder so that each said projection rides along said ramp surface of the respective detent for effecting the respective displacement of said latching plate and then engages the respective shoulder upon actuation of the respective push-button to its active position.

11. A recording and/or reproducing apparatus according to claim 10; in which said engageable means for effecting said displacement of the latching plate in response to actuation of the stop push-button includes a projection extending substantially normal to the direction of movement of said stop push-button, and a ramp surface having at least a portion inclined relative to said latching plate and being still engaged by said projection associated with the stop push-button in said active position of the latter.

12. A recording and/or reproducing apparatus according to claim 10; in which said displacement of the latching plate in said opposite direction in response to movement of said forward push-button to said active position of the latter is greater than said displacements of the latching plate in response to movement of said record and additional push-buttons to their respective active positions so that said detent corresponding to said forward push-button is releasable from the respective keeper only in response to actuation of said stop push-button to its active position.

13. A recording and/or reproducing apparatus according to claim 10; in which said means yieldably urging said latching plate in said one direction includes first spring means continuously acting on said latching plate and applying a relatively weak force to the latter in said one direction which is insufficient to overcome the frictional resistance to movement of the latching plate in said one direction resulting from the engagement of said shoulder of one of said detents with the respective projection, and second spring means selectively acting on said latching plate for applying a relatively strong force to the latter in said one direction.

14. A recording and/or reproducing apparatus according to claim 13; further comprising means for causing said second spring means to apply said relatively strong force to said latching plate only in response to actuation of said record push-button to said active position of the latter.

15. A recording and/or reproducing apparatus according to claim 9; in which said at least one additional push-button includes a rewind push-button actuable from a rest position to an active position for establishing a rewind mode of operation of the apparatus, and a fast-forward push-button actuable from a rest position to an active position for establishing a fast-forward mode of operation of the apparatus.

16. A recording and/or reproducing apparatus according to claim 1; in which said push-button assembly further includes rewind and fast-forward push-buttons selectively actuable from a rest position to an active position for establishing rewind and fast-forward modes of operation, respectively, of the apparatus; and latching means for selectively retaining each of said record, forward, rewind and fast-forward push-buttons in the respective active position, said latching means being released as to all of said record, forward, rewind and fast-forward push-buttons in response to actuation of said stop push-button, said latching means being released as to said record push-button upon actuation of a selected one of said rewind and fast-forward push-buttons, and said latching means being made inoperative to retain said rewind and fast-forward push-buttons in their respective active positions when said forward push-button is in said active position of the latter.

* * * * *